United States Patent
Dalton (10) Patent No.: US 9,922,046 B2
(45) Date of Patent: Mar. 20, 2018

(54) SCALABLE DISTRIBUTED METADATA FILE-SYSTEM USING KEY-VALUE STORES

(71) Applicant: Zettaset, Inc., Mountain View, CA (US)

(72) Inventor: Michael W. Dalton, San Francisco, CA (US)

(73) Assignee: ZETTASET, INC., Mountain View, CA (US)

(*) Notice: Subject to any disclaimer, the term of this patent is extended or adjusted under 35 U.S.C. 154(b) by 66 days.

(21) Appl. No.: 15/150,706

(22) Filed: May 10, 2016

(65) Prior Publication Data

US 2016/0321295 A1     Nov. 3, 2016

Related U.S. Application Data (63) Continuation-in-part of application No. 13/455,891, filed on Apr. 25, 2012, now abandoned.

(60) Provisional application No. 61/517,796, filed on Apr. 26, 2011.

(51) Int. Cl.
  *G06F 17/30*     (2006.01)

(52) U.S. Cl.
  CPC ...... *G06F 17/30194* (2013.01); *G06F 17/301* (2013.01); *G06F 17/3012* (2013.01); *G06F 17/30091* (2013.01); *G06F 17/30094* (2013.01); *G06F 17/30138* (2013.01)

(58) Field of Classification Search
  CPC ......... G06F 17/30575; G06F 17/30194; G06F 3/0608; G06F 17/3012; G06F 17/30312; G06F 17/30067; G06F 17/30129; G06F 17/30327; G06F 11/1464

USPC .................................................. 707/652, 827
See application file for complete search history.

(56) References Cited

U.S. PATENT DOCUMENTS

| | | | |
|---|---|---|---|
| 6,356,863 | B1 | 3/2002 | Sayle |
| 7,174,346 | B1 | 2/2007 | Gharachorloo et al. |
| 7,213,191 | B2 | 5/2007 | Chao |
| 7,523,123 | B2 | 4/2009 | Yang et al. |
| 7,526,534 | B2 | 4/2009 | Henseler |
| 7,548,928 | B1 * | 6/2009 | Dean ............... G06F 17/30985 |

(Continued)

OTHER PUBLICATIONS

Chang et al. "Bigtable: A Distributed Storage System for Structured Data" OSDI 2006.*

(Continued)

*Primary Examiner* — Dennis Truong
(74) *Attorney, Agent, or Firm* — Asif Ghias (57) ABSTRACT

A computer-implemented distributed file-system in a distributed data network in which metadata related to the files and directories of the file-system is distributed. A unique and non-reusable inode number is assigned to each file/directory of the file-system. A key-value store built up in rows is created for the distributed metadata. Each of the rows has a composite row key and a row value (key-value pair) where the composite row key for each file/directory includes the inode number of the parent directory, and a name of the file/directory. For files below the maximum file size, the entire file or portion thereof is encoded in the corresponding row value of the key-value pair. In this case, the corresponding composite row key holds the inode number of the file itself and an offset information of the data of the file in the row value. Files above maximum file size are stored in a large-scale storage.

19 Claims, 4 Drawing Sheets

(56) References Cited

U.S. PATENT DOCUMENTS

| | | | |
|---|---|---|---|
| 8,849,825 B1* | 9/2014 | McHugh | G06F 17/3023 707/737 |
| 2004/0030822 A1* | 2/2004 | Rajan | G06F 3/0605 711/4 |
| 2005/0091569 A1* | 4/2005 | Chao | G06F 11/1004 714/758 |
| 2008/0123855 A1 | 5/2008 | Thomas | |
| 2010/0023541 A1 | 1/2010 | Cosic | |
| 2010/0083004 A1 | 4/2010 | Kirshenbaum | |
| 2010/0106734 A1* | 4/2010 | Calder | G06F 17/30011 707/758 |
| 2010/0122065 A1* | 5/2010 | Dean | G06F 17/30445 712/203 |
| 2011/0313973 A1* | 12/2011 | Srivas | G06F 17/30194 707/634 |

OTHER PUBLICATIONS

Srivas et al. "MapR File System (MapRFS) Architecture" Provisional Application to US 20110313973 A1; Jun. 19, 2010.*

Chang, et al., "Bigtable: A Distributed Storage System, for Structured Data" Google Trans CS, 2008, pp. 1-14.S.

Dean, et al., "MapReduce: Simplified Data Processing on Large Clusters," USENIX Association, OSDI : 6th Symposium on Operating Systems Design and Implementation, 2008, pp. 137-149.

DeCandia, et al., "Dynamo Amazons' Highly Available Key-value Store," SIGOPS, 2007, pp. 205-220.

Loebman, et al., "Analyzing Massive Astrophysical Datasets: Can Pig/Hadoop or a Relational DBMS Help?," IEEE, 2009, 10 pages.

Otoo, et al., "Accelerating Queries on Very Large Datasets," SciData Management, 2009, pp. 1-34.

Thor, "Web Scale Databases," University of Maryland & University of Leipzig, 2011, 59 pages.

* cited by examiner

SCALABLE DISTRIBUTED METADATA FILE-SYSTEM USING KEY-VALUE STORES

RELATED APPLICATIONS

This application is a Continuation-in-part of U.S. patent application Ser. No. 13/455,891 filed on Apr. 25, 2012, which claims priority from U.S. Provisional Patent Application 61/517,796 filed on Apr. 26, 2011. Both of the above numbered applications are incorporated herein by reference in their entireties.

FIELD OF THE INVENTION

This invention relates generally to a distributed file-system in which metadata related to its files and directories is distributed amongst the servers of its supporting distributed data network. More specifically, the presented invention is related to a distributed metadata file-system that supports high-performance and high-scalability file storage in distributed data networks.

BACKGROUND ART

The exponential growth of Internet connectivity and data storage needs has led to an increased demand for scalable, fault tolerant distributed file-systems for processing and storing large-scale data sets. Large data sets may be tens of terabytes to petabytes in size. Such data sets are far too large to store on a single computer.

Distributed file-systems are designed to solve this issue by storing a file-system partitioned and replicated on a cluster of multiple servers. By partitioning large scale data sets across tens to thousands of servers, distributed file-systems are able to accommodate large-scale file-system workloads.

Many existing petabyte-scale distributed file-systems rely on a single-master design, as described, e.g., by Sanjay Ghemawat, H. G.-T., "The Google File-system", 19th ACM Symposium on Operating System Principles, Lake George, N.Y. 2003. In that case, one master machine stores and processes all file-system metadata operations, while a large number of slave machines store and process all data operations. File metadata consists of all of the data describing the file itself. Metadata thus typically includes information such as the file owner, contents, last modified time, unique file number or other identifiers, data storage locations, and so forth.

The single-master design has fundamental scalability, performance and fault tolerance limitations. The master must store all file metadata. This limits the storage capacity of the file-system as all metadata must fit on a single machine. Furthermore, the master must process all file-system operations, such as file creation, deletion, and rename. As a consequence, unlike data operations, these operations are not scalable because they must be processed by a single server. On the other hand, data operations are scalable, since they can be spread across the tens to thousand of slave servers that process and store data. Also noted, that metadata for a file-system with billions of files can easily reach terabytes in size, and such workloads cannot be efficiently addressed with a single-master distributed file-system.

The trend of increasingly large data sets and an emphasis on real-time, low-latency responses and continuous availability has also reshaped the high-scalability database field. Distributed key-value store databases have been developed to provide fast, scalable database operations over a large cluster of servers. In a key-value store, each row has a unique key, which is mapped to one or more values. Clients create, update, or delete rows identified by their respective key. Single-row operations are atomic.

Highly scalable distributed key-value stores such as Amazon Dynamo described, e.g., by DeCandia, G. H., "Dynamo: Amazon's Highly-Available Key-Value Store", 2007, *SIGOPS Operating Systems Review*, and Google BigTable described, e.g., by Chang, F. D., "Bigtable: A Distributed Storage System for Structured Data", 2008, *ACM Transactions on Computer Systems*, have been used to store and analyze petabyte-scale datasets. These distributed key-value stores provide a number of highly desirable qualities, such as automatically partitioning key ranges across multiple servers, automatically replicating keys for fault tolerance, and providing fast key lookups. The distributed key-value stores support billions of rows and petabytes of data.

What is needed is a system and method for storing distributed file-system metadata on a distributed key-value store, allowing for far more scalable, fault-tolerant, and high-performance distributed file-systems with distributed metadata. The challenge is to provide traditional file-system guarantees of atomicity and consistency even when metadata may be distributed across multiple servers, using only the operations exposed by real-world distributed key-value stores.

OBJECTS AND ADVANTAGES OF THE INVENTION

In view of the shortcomings of the prior art, it is an object of the invention to provide a method for deploying distributed file metadata in distributed file-systems on distributed data networks in a manner that is more high-performance and more scalable than prior art distributed file metadata approaches.

It is another object of the invention to provide a distributed data network that is adapted to such improved, distributed file metadata stores.

These and many other objects and advantages of the invention will become apparent from the ensuing description.

SUMMARY OF THE INVENTION

The objects and advantages of the invention are secured by a computer-implemented method for constructing a distributed file-system in a distributed data network in which metadata related to files and their directories is distributed. The method of invention calls for assigning a unique and non-reusable inode number to identify not only each file but also each directory of the distributed file-system. A key-value store built up in rows is created for the distributed metadata. Each of the rows has a composite row key and a row value pair, also referred to herein as key-value pair. The composite row key for each specific file/directory includes the inode number of the parent directory and a name of the file/directory.

The data file, or more simply just file, is treated differently depending on whether it is below or above a maximum file size. For files below the maximum file size a file offset is provided in the composite row key and the corresponding row value of the key-value pair is encoded with at least a portion of the file or even the entire file if it is sufficiently small. In this case, the composite row key holds the inode number of the file itself, and the offset information of the data of the file in the row value. Data files, or more simply just files, that are above the maximum file size are stored in a large-scale storage subsystem of the distributed data network.

Preferably, data files below the maximum file size are broken up into blocks. The blocks have a certain set size to ensure that each block fits in the row value portion of the key-value pair that occupies a row of the key-value store. The data file thus broken up into blocks is then encoded in successive row values of the key-value store. The composite row key associated with each of the successive row values in the key-value store contains the inode number of the file and an adjusted file offset, indicating blocks of the data file for easy access.

It is important that certain operations on any data file belonging to the data files whose metadata is distributed according to the invention be atomic. In other words, these operations should be indivisible and apply to only a single row (key-value pair) in the key-value store at a time. These operations typically include file creation, file deletion and file renaming. Atomicity can be enforced by requiring these operations to be lock-requiring operations. Such operations can only be performed while holding a leased row-level lock. One useful type of row-level lock in the context of the present invention is a mutual-exclusion type lock.

In a preferred embodiment of the method, the distributed data network has one or more file storage clusters. These may be collocated with the servers of a single cluster, several clusters or they may be geographically distributed in some other manner. Any suitable file storage cluster has a large-scale storage subsystem, which may comprise a large number of hard drives or other physical storage devices. The subsystem can be implemented using Google's BigTable, Hadoop, Amazon Dynamo or any other suitable large-scale storage subsystem operation.

The invention further extends to distributed data networks that support a distributed file-system with distributed metadata related to the files and directories in the file-system. In such networks, a first mechanism assigns the unique and non-reusable inode numbers that identify each file and directory of the file-system. The key-value store holding the distributed metadata is distributed among a set of servers. A second mechanism provides a composite row key for describing the name of the file or the directory, as well as the inode number of the parent directory of the file or the directory.

Local resources in at least one of the servers, are used for storing in the row value at least a portion of the file if it is sufficiently small, i.e., if it is below the maximum file size. Files exceeding this maximum file size are stored in the large-scale storage subsystem. If a file is stored locally in the local resources, a third mechanism provides the composite row key to contain the inode number of the file itself and an offset information representing where in the value portion of the key-value pair, the data belonging to the file is stored.

The distributed data network can support various topologies but is preferably deployed on servers in a single cluster. Use of servers belonging to different clusters is permissible, but message propagation time delays have to be taken into account in those embodiments. Also, the large-scale storage subsystem can be geographically distributed.

The details of the method and distributed data network of the invention, including the preferred embodiment, will now be described in detail in the below detailed description with reference to the attached drawing figures.

DETAILED DESCRIPTION

Figure 1:
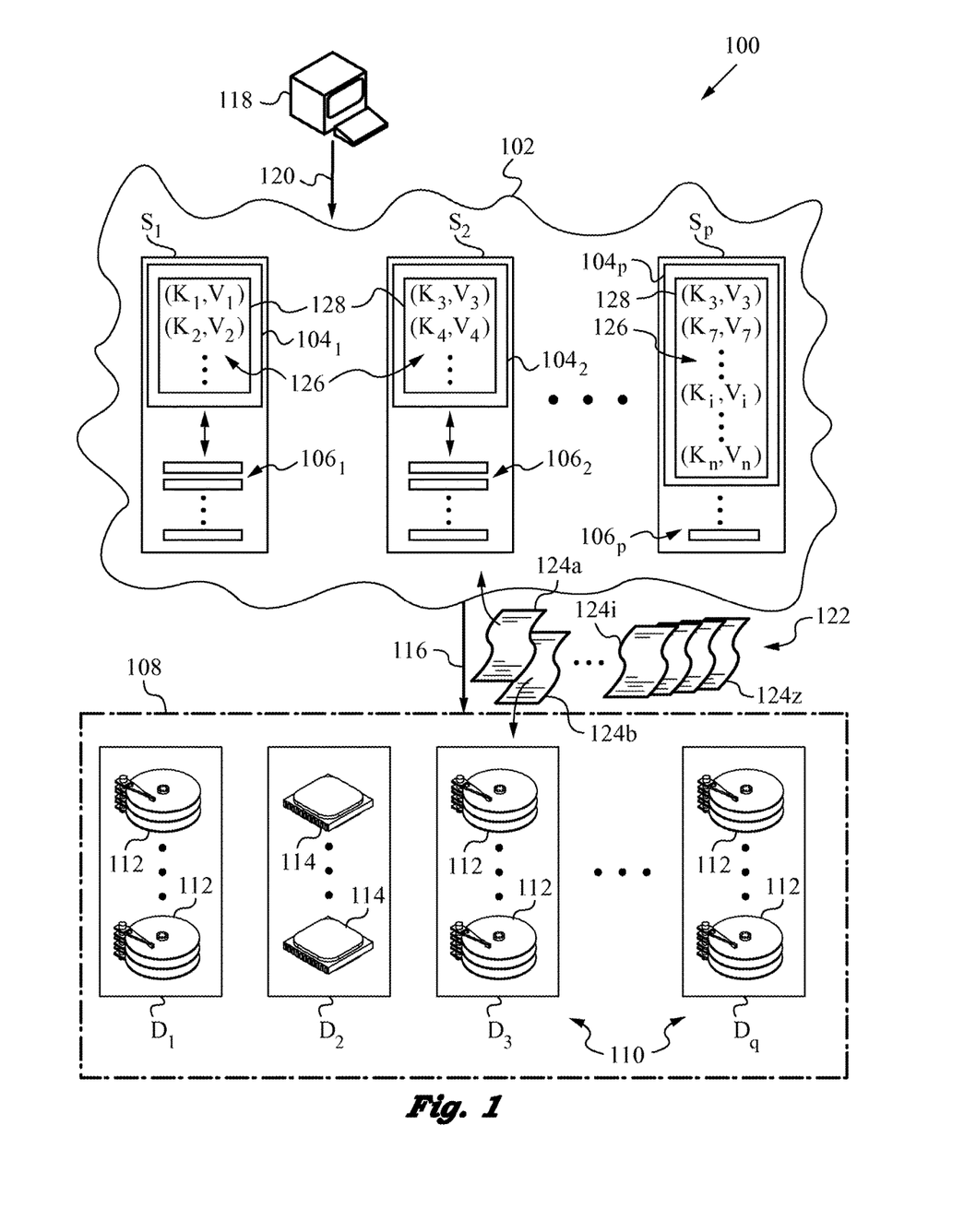
FIG. 1 is a diagram illustrating the overall layout of the distributed file-system and its supporting distributed data network with a number of servers sharing a distributed key-value store according to the invention.

The present invention will be best understood by initially referring to the diagram of a distributed data network 100 supporting a distributed file-system 122 as shown in FIG. 1. Network 100 utilizes a number of servers $S_1, S_2, \ldots, S_p$, which may include hundreds or even thousands of servers. In the present embodiment, servers $S_1, S_2, \ldots, S_p$ belong to a single cluster 102. Each of servers $S_1, S_2, \ldots, S_p$ has corresponding processing resources $104_1, 104_2, \ldots, 104_p$, as well as local storage resources $106_1, 106_2, \ldots, 106_p$. Local storage resources $106_1, 106_2, \ldots, 106_p$ may include rapid storage systems, such as solid state flash, and they are in communication with processing resources $104_1, 104_2, \ldots, 104_p$ of their corresponding servers $S_1, S_2, \ldots, S_p$. Of course, the exact provisioning of local storage resources $106_1, 106_2, \ldots, 106_p$ may differ between servers $S_1, S_2, \ldots, S_p$.

Distributed data network 100 has a file storage cluster 108. Storage cluster 108 may be collocated with servers $S_1, S_2, \ldots, S_p$ in the same physical cluster. Alternatively, storage cluster 108 may be geographically distributed across several clusters. In any event, file storage cluster 108 has a large-scale storage subsystem 110, which includes groups $D_1, D_2, \ldots, D_q$ of hard drives 112 and other physical storage devices 114. The number of actual hard drives 112 and devices 114 is typically large in order to accommodate storage of data files occupying many petabytes of storage space. Additionally, a fast data connection 116 exists between servers $S_1, S_2, \ldots, S_p$ of cluster 102 and file storage cluster 108.

FIG. 1 also shows a user or client 118, connected to cluster 102 by a connection 120. Client 118 takes advantage of connection 120 to gain access to servers $S_1, S_2, \ldots, S_p$ of cluster 102 and to perform operations on data files residing on them or in large-scale storage subsystem 110. For example, client 118 may access data files of interest in their corresponding directories for reading, writing or other file operations as will be further taught below. Of course, it will be clear to those skilled in the art that cluster 102 supports access by very large numbers clients. Thus, client 118 should be considered here for illustrative purposes and to clarify the operation of network 100 and the invention.

The computer-implemented method and associated apparatuses according to the invention address the construction of a distributed file-system 122 in distributed data network 100. Distributed file-system 122 contains many individual data files 124a, 124b, . . . , 124z. Some of data files 124a, 124b, . . . , 124z are stored on local storage resources $106_1, 106_2, \ldots 106_p$, while some of data files 124a, 124b, . . . , 124z are stored in large-scale storage subsystem 110.

In accordance with the invention, the decision on where any particular data file 124$i$ is stored depends on its size in relation to a maximum file size. Data file 124$a$ being below the maximum file size is stored on one of servers $S_1$, $S_2$, ..., $S_p$, thus taking advantage of storage resources $106_1$, $106_2$, ... $106_p$. In contrast, data file 124$b$ exceeds maximum file size and is therefore stored in large-scale storage subsystem 100 of file storage cluster 108.

It should be remarked here that throughout this specification, references to data files or files and the metadata related to those files will be construed to include the directories (or directory trees) in/under which the files actually reside, as well as the files themselves. In other words, there is metadata related to the files as well as the directories, and this metadata is distributed in the distributed file-system, as will be taught below. Furthermore, other related constructs such as the inode number for the identification of files, also applies to the identification of the directories in the distributed file-system. However, in order to avoid unnecessary repetition, unless otherwise explicitly required, we may refer to the metadata related to just the files or the inode numbers of just the files, with the implicit understanding that the same applies to the directories of the distributed file-system as well.

It should be further remarked that throughout this specification, any reference to 'data files' is construed to include any type of file in the file-system, whether it is simple text, binary, executable, source code, object code, plaintext, encrypted, etc. Thus conveniently, files may be referred to as data files or more simply just as files.

To understand the invention in more detail, it is necessary to examine how file metadata 126 related to data files 124$a$, 124$b$, ..., 124$z$ is distributed. In particular, file metadata 126 is distributed among servers $S_1$, $S_2$, ..., $S_p$, rather than residing on a single server, e.g., a master, as in some prior art solutions. Furthermore, metadata 126 is used in building up a distributed key-value store 128. The rows of key-value store 128 contain distributed file metadata 126 in key-value pairs represented as ($K_i$,$V_i$) (where K=key and V=value). Note that any specific key-value pair may be stored several times, e.g., on two different servers, such as key-value pair ($K_3$,$V_3$) residing on servers $S_2$ and $S_p$. Also note, that although key-value pairs ($K_i$,$V_i$) are ordered (sorted) on each of servers $S_1$, $S_2$, ..., $S_p$, in the diagram, that is not a necessary condition, as will be addressed below.

Figure 2:
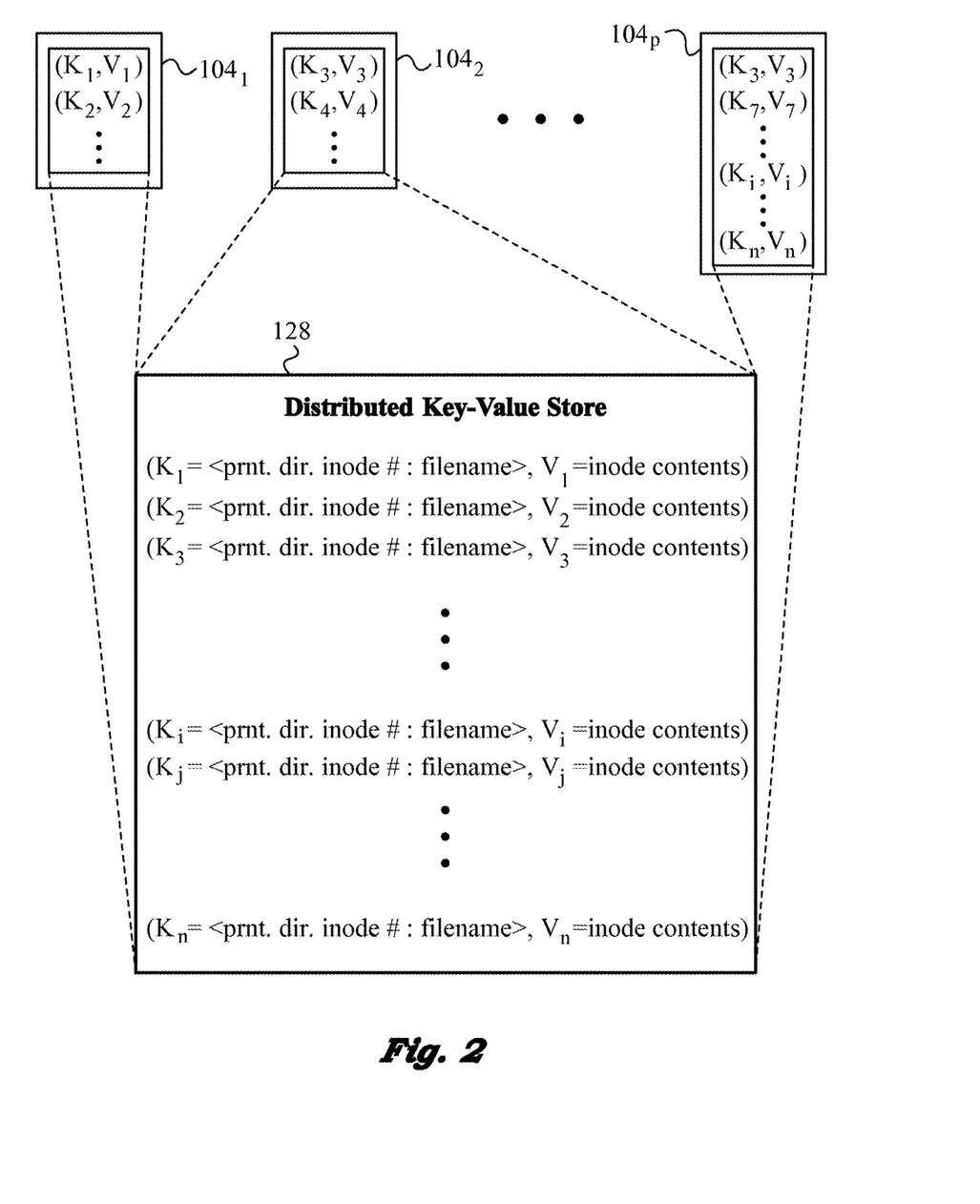
FIG. 2 is a detailed diagram illustrating the key-value store distributed among the servers of the distributed data network of FIG. 1.

We now refer to the more detailed diagram of FIG. 2 illustrating key-value store 128 that is distributed among servers $S_1$, $S_2$, ..., $S_p$ of distributed data network 100 abstractly collected in one place. FIG. 2 also shows in more detail the contents of the rows (key-value pairs ($K_i$,$V_i$)) of distributed key-value store 128.

The method and systems of the invention call for a unique and non-reusable inode number to identify not only each file 124$a$, 124$b$, ..., 124$z$ of the distributed data file-system 122, but also the directories of files 124$a$, 124$b$, ..., 124$z$. Key-value store 128 created for distributed file metadata 126 contains these unique and non-reusable inode numbers, assigned to all files and directories of the distributed file-system. Preferably, the inode numbers are generated by a first mechanism that is a counter. Counters should preferably be on a highly-available data storage system that is synchronously replicated. Key-Value stores such as BigTable meet that requirement and can store the counter as the value of a pre-specified key as long as an atomic increment operation is supported on keys. The sequential nature of inode numbers ensures that they are unique and a very large upper bound on the value of these numbers ensures that in practical situations their number is unlimited.

As shown in FIG. 2, each of the rows of key-value store 128 has a composite row key $K_i$ and a row value $V_i$, which together form the key-value pair ($K_i$, $V_i$). Each one of row keys $K_i$ is referred to as composite row key, because it contains multiple fields, and the fields may differ depending on the context. In one case, for each specific file 124$i$ it includes the inode number of the parent directory of file 124$i$ and a name of file 124$i$, or $K_i$=<prnt. dir. inode #:filename>. More explicitly, $K_i$=<inode # of parent directory of file 124$i$:filename of file 124$i$>. In the case of directories, same convention applies. In other words, each key-value pair ($K_i$,$V_i$) represents either a file or a directory in key-value store 128. In order to represent a directory, the filename portion in composite row key $K_i$ above is substituted with the name of the directory. Stated differently, each key-value pair ($K_x$,$V_x$) in distributed key-value store 128 represents a file 124$x$ or a directory 124$x$ in distributed file-system 122 of FIG. 1. In either case, composite row key $K_x$=<inode # of parent directory of file/directory 124$x$:filename of file/directory 124$x$>.

The contents of composite row key $K_i$ in other cases will be explained further in below examples and embodiments. Furthermore, the contents of the row value portion, or simply the value portion, of the key-value pairs ($V_x$ or $V_i$ of the above examples) will also be explained below.

Figure 3:
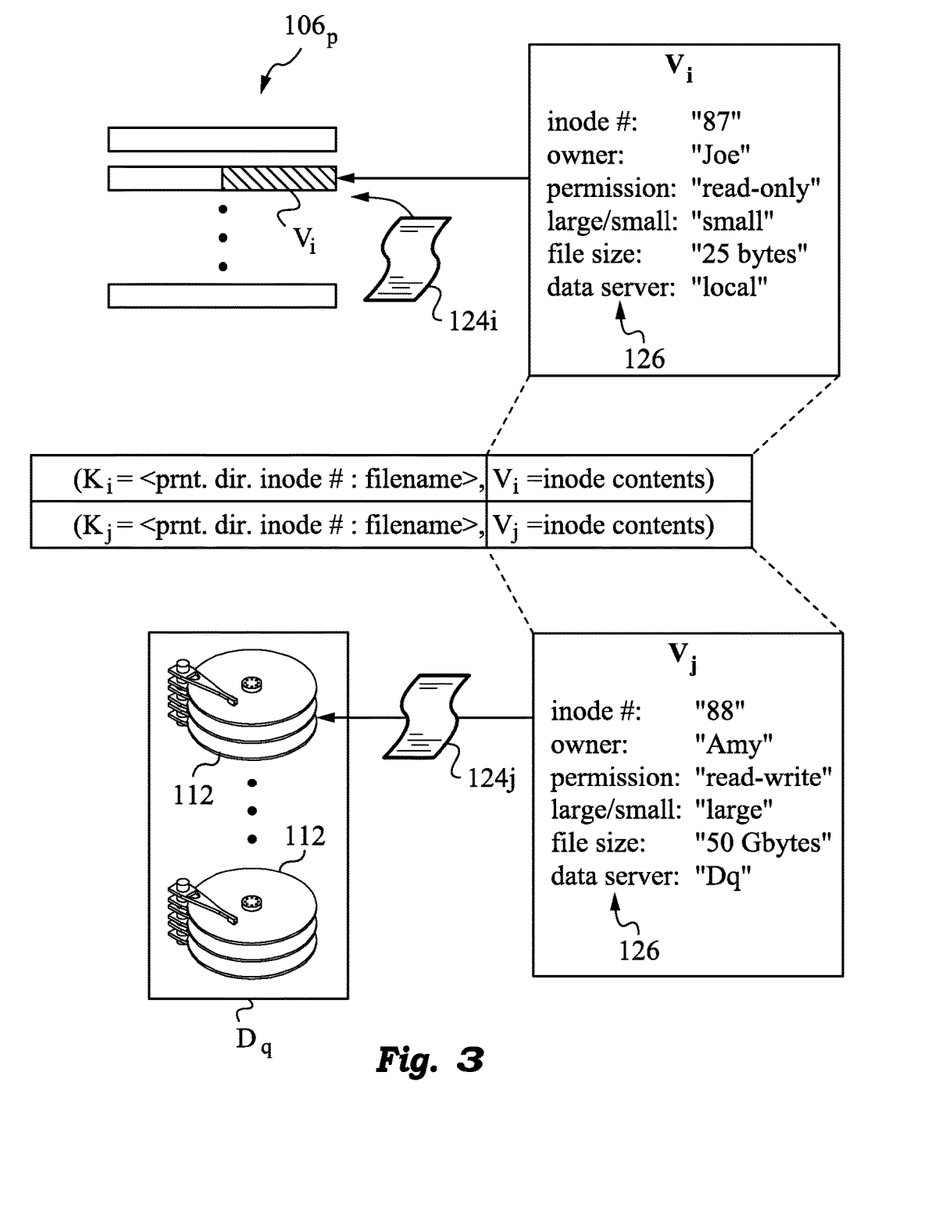
FIG. 3 is a still more detailed diagram illustrating the contents of two key-value pairs belonging to the key-value store shown in FIG. 2.

FIG. 3 is a still more detailed diagram illustrating the contents of key-value pairs ($K_i$,$V_i$), ($K_j$, $V_j$) belonging to distributed key-value store 128. In this diagram we see that file data itself is stored directly in key-value store 128 for data files up to the size that key-value store 128 permits. This high value is the maximum file size, typically on the order of many Mbytes.

Specifically, file 124$i$ is small, as indicated by the metadata in the contents of row value $V_i$, which contains metadata 126 related to file 124$i$. In the present case, metadata 126 includes inode number (inode #:"87"), identification of owner (owner:"Joe"), permissions (permission:"read-only"), file size classification (large/small:"small"), file size (file size:"26 bytes") and storage location (data server: "local"). Thus, since file 124$i$ is below maximum file size, it is stored locally on storage resources 106p directly in distributed key-value store 128 itself.

Meanwhile, file data that is too large to fit in key-value database is stored in one or more traditional fault-tolerant, distributed file-systems in the large-scale storage subsystem 110. These distributed file-systems do not need to support distributed metadata and can be embodied by file-systems such as highly-available Network File Server (NFS) or the Google File-system. Preferably, the implementation uses as large-scale file store one or more instances of the Hadoop Distributed File-system, e.g., as described by Cutting, D. E, (2006). Hadoop. Retrieved 2010, from Hadoop: http://hadoop.apache.org. Since the present invention supports an unbounded number of large-scale file stores (which are used solely for data storage, not metadata storage), the metadata scalability of any individual large-scale file store does not serve as an overall file-system storage capacity bottleneck. In other words, the subsystem can be implemented using Google's BigTable, Hadoop, Amazon Dynamo or any other suitable large-scale storage subsystem operation, yet without creating the typical bottlenecks.

In the example of FIG. 3, data file 124$j$ is larger than maximum file size, as indicated by its metadata 126 in row value $V_j$. Therefore, data file 124*j* is sent to large-scale storage subsystem 110, and more particularly to group $D_q$ of hard drives 112 for storage.

Figure 4A:
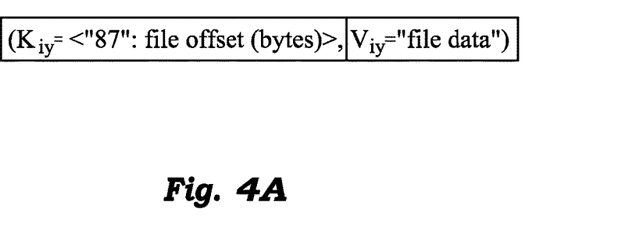
FIG. 4A-B are diagrams showing the break-up of a small data file (data file smaller than maximum file size) into blocks.
Figure 4B:
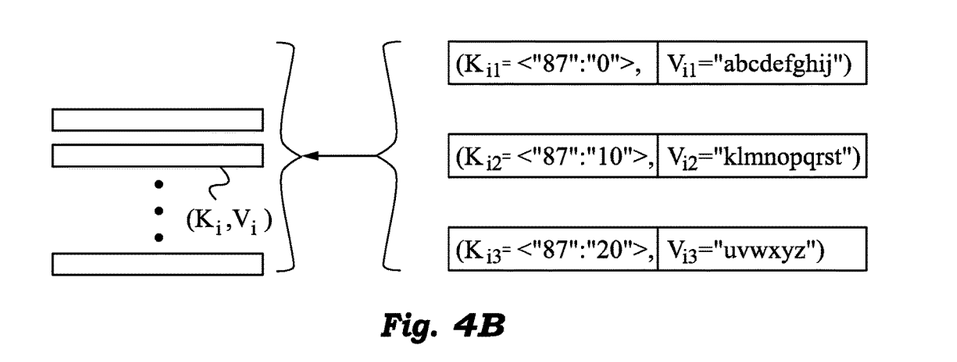

FIG. 4A-B are diagrams showing the break-up of a small data file, specifically data file 124*i*, into blocks. The breaking of data file 124*i* into fixed-size blocks enables the 'data' of the file to be stored directly in the inode that is the content of row value $V_i$. In the present example, the block size is 10 bytes. When storing a block of data file 124*i* directly in row value $V_i$, the composite row key $K_i$ is supplemented with file offset information, which is specified in bytes. Thus, in the case of representing a small file that can be stored locally in the inode contents, composite row key $K_i$ contains the inode number of the file itself, along with the offset information of the file data in the row value or value portion $V_i$ of the key-value pair. More explicitly in this case, and as shown in FIG. 4A, $K_{iy}$=<inode # of file 124*i*:Offset information of file data in value portion $V_{iy}$>.

Referring now to FIG. 4B, we see that for a file size of 26 bytes three blocks of 10 bytes are required. File data of data file 124*i* is encoded and stored into key-value store 128 one block per row in successive rows. The file data rows are identified by a unique per-file identification number (inode number) and byte offset of the block within the file. File 124*i* takes up three rows in key-value store 128. These rows correspond to key-value pairs ($K_{i1}$,$V_{i1}$), ($K_{i2}$,$V_{i2}$) and ($K_{i3}$,$V_{i3}$). Notice that all these rows have the same inode number ("87"), but the offset is adjusted in each row (0, 10 and 20 bytes respectively). Although in key-value store 128 these rows happen to be sorted, this is not a necessary condition. At the very least, the key-value stores need to be strongly consistent, persistent and support both locks and atomic operations on single keys. Multi-key operations are not required, and key sorting is not required (although key sorting does allow for performance improvements).

It is important that certain operations on any data file belonging to the data files whose metadata is distributed according to the invention be atomic, meaning that they are indivisible. In other words, these operations should apply to only a single row (key-value pair) in the key-value store at a time. These operations typically include file creation, file deletion and file renaming. Atomicity can be enforced by requiring these operations to be lock-requiring operations. Such operations can only be performed while holding a leased row-level lock. One useful type of row-level lock in the context of the present invention is a mutual-exclusion type lock.

The invention further extends to distributed data networks that support a distributed file-system with distributed metadata related to the data files of interest. In such networks, a first mechanism, which is embodied by a counter, assigns the unique and non-reusable inode numbers that identify each file and each directory of the distributed file-system. The key-value store holding the distributed file metadata is distributed among a set of servers. A second mechanism provides a composite row key for describing the name of the data file or the directory, as well as the inode number of the parent directory of the file or the directory as explained earlier.

Local resources in at least one of the servers, are used for storing in the row value at least a portion of the data file if it is sufficiently small, i.e., if it is below the maximum file size, e.g., 256 Mbytes with current embodiments. This size can increase in the future. Data files exceeding this maximum file size are stored in the large-scale storage subsystem. If a data file is stored locally in the local resources, a third mechanism provides the composite row key to contain the inode number of the file itself and an offset information representing where in the value portion of the key-value pair, the data belonging to the file is stored.

Figure 5:
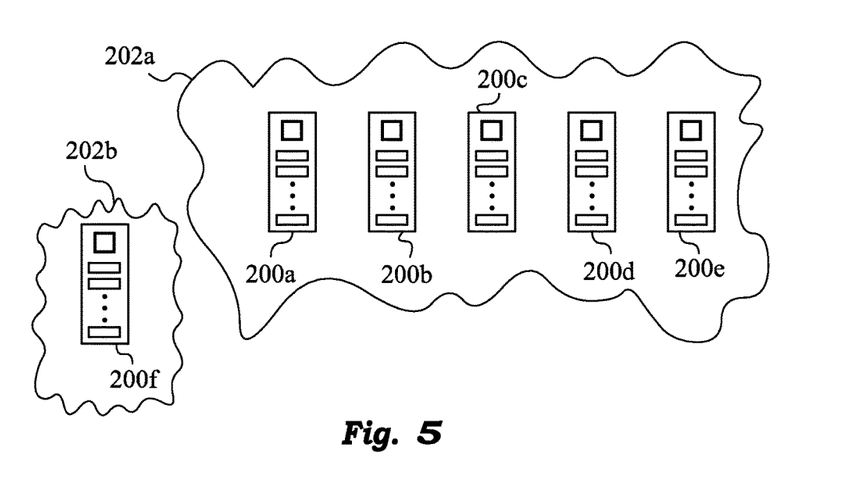
FIG. 5 is a diagram illustrating the application of the distributed key-value store over more than one cluster of servers.

A distributed data network according to the invention can support various topologies but is preferably deployed on servers in a single cluster. FIG. 5 illustrates the use of servers 200*a-f* belonging to different clusters 202*a-b*. Again, although this is permissible, the message propagation time delays have to be taken into account in these situations. A person skilled in the art will be familiar with the requisite techniques. Also, the large-scale storage subsystem can be geographically distributed. Once again, propagation delays in those situations have to be accounted for.

The design of distributed data network allows for performance of all standard file-system operations, such as file creation, deletion, and renaming while storing all metadata in a distributed key-value store. All operations are atomic (or appear to be atomic), without requiring the distributed key-value store to support any operations beyond single-row atomic operations and locks. Furthermore, only certain operations, such as renaming and rename failure recovery require the client to obtain a row lock. All other operations are performed on the server and do not require the client to acquire explicit row locks.

Existing distributed key-values do not support unlimited-size rows, and are not intended for storing large (multi-terabyte files). Thus, placing all file data directly into a key-value store is not required in this design for all file sizes. Many existing distributed file-systems can accommodate a reasonable number (up to millions) of large files given sufficient slaves for storing raw data. However, these storage systems have difficulty coping with billions of files. Most file-systems are dominated by small files, usually less than a few megabytes. To support both enormous files and numerous (billions) small files, the present invention thus takes a hybrid approach.

Small files, where small is a user-defined constant based on the maximum row number of the key-value store, are stored directly in the key-value store in one or more blocks. Each row stores a single block. Preferably, a block size of eight kilobyte and a maximum file size of one megabyte are used as cutoff value for storing a file directly in the key-value store. Large files, such as movies or multi-terabyte datasets, are stored directly in one or more existing large-scale storage subsystem such as the Google File-system or a SAN.

A preferred embodiment uses one or more Hadoop Distributed File-system clusters as a large-scale file repository. The only requirement for the instant file-system is that the large-scale repository be distributed, fault tolerant, and capable of storing large files. It is assumed that the large-scale file repositories do not have distributed metadata, which is why multiple large-scale storage clusters are supported. This is not a bottleneck because no metadata is stored in large-scale storage clusters, and the file-system of the instant invention supports an unbounded number of large-scale storage clusters. Large files include a URL describing the file's location on the large-scale storage system in the file inode.

Files stored in the key-value store are accessed using a composite key row key consisting of the file inode number and the block offset. The resulting row's value will be the block of raw file data located at the specified block offset. The last block of a file may be smaller than the block size if the overall file size is not a multiple of the block size, e.g., as in the example described in FIG. 4B.

The great advantage of the methods and systems/networks of the invention is that they easily integrate with existing structures and mechanisms. Below, we detail the particulars of how to integrate the advantageous aspects of the invention with such existing systems.

Requirements

The distributed key value store must provide a few essential properties. Single-row updates must be atomic. Furthermore, single row compare-and-update and compare-and-delete operations must be supported, and must also be atomic. Finally, leased single-row mutex (mutual exclusion) locks must be supported with a fixed lease timeout (60 seconds in our implementation). While a row lock is held, no operations can be performed on the row by other clients without the row lock until the row lock lease expires or the row is unlocked. Any operation, including delete, read, update, and atomic compare-and-update/delete may be performed with a row lock. If the lock has expired, the operation fails and returns an error, even if the row is currently unlocked. Distributed key-value stores such as HBase as described, e.g., by Michael Stack, et al., (2007), HBase. retrieved from HBase: http://hadoop.apache.org/hbase/ meet these requirements.

Let us now describe how distributed key-value store 128 supports all standard file-system operations:

Bootstrapping the Root Directory

The root directory is assigned a fixed inode number of 0, and has a hardcoded inode. While the root inode is not directly stored in the key-value store, the directory entries describing any directories or files contained within the root directory are contained in the key-value store, as will be apparent from the above teachings.

Pathname Resolution/Lookup

To look up a file, the absolute file path is broken into a list of path elements. Each element is a directory, except the last element, which may be a directory or file (if the user is resolving a file or directory path, respectively). To resolve a path with N path elements, including the root directory, the system fetches N−1 rows from the distributed key value store.

Initially, the root directory inode is fetched as described in the 'Bootstrapping the Root Directory' section above. Then the system fetches each of the remaining N−1 path elements from the key-value store. When fetching an element, the inode number for its parent directory will be known (as that was the element most recently fetched), as well as the name of element itself will be known. Thus the requisite composite row key for the above taught cases is formed, consisting of the inode number of the parent directory and the element name. Then the resulting row in the key-value store is looked up. The value of that row is the inode for the path element, containing the inode number and all other metadata. If the row value is empty, then the path element does not exist and an error is returned.

If the path element is marked 'pending' as described in the 'Rename Inode Failure Recovery' section below, rename repair must be performed as described in the aforementioned section before the inode can be returned by a lookup operation.

Create File or Directory Inode

To create a file or directory, the parent directory is first looked up, as described in the 'Pathname Resolution/Lookup' section above. Then a new inode is created describing the file or directory, which requires generating a new unique inode number for the file or directory, as well as recording all other pertinent file-system metadata, such as storage location, ownership, creation time, etc.

A composite row key is created by taking the inode number of the parent directory and the name of the file or directory to be created. The corresponding value portion of the key-value pair for the composite key just created, is the newly generated inode. The resulting key-value pair is inserted in the distributed key-value store. To ensure that file/directory creation does not overwrite an existing file or directory, the key-value pair is inserted by instructing the distributed key-value store to perform an atomic compare-and-update. An atomic compare-and-update overwrites the row identified by the aforementioned composite row key with the new inode value only if the current value of the row is equal to the comparison value. By setting the comparison value to null (or empty), it is ensured that the row is only updated if the previous value was non-existent, so that file and directory creation do not overwrite existing files or directories. Otherwise an error occurs and the file creation may be re-tried.

Delete File or Directory Inode

To delete a file or directory, the parent directory inode is first looked up as describing in the 'Pathname Resolution/Lookup' section above. A composite row key is then formed using the parent directory inode number and the name of the file or directory to be deleted. Only empty directories may be deleted (users must first delete the contents of an empty directory before attempting to delete the directory itself). The row is then read from the distributed key-value store to ensure that the deletion operation is allowed by the system. An atomic compare-and-delete is then performed using the same row key. The comparison value is set to the value of the inode read in the previous operation. This ensures that no time-of-check to time-of-use (TOCTTOU/TOCTOU) security vulnerabilities are present in the system design while avoiding excessive client-side row locking.

Update File or Directory Inode

File or directory inodes may be updated to change file or directory metadata, including security permissions, last modified access time, ownership, etc. Updates are not permitted to change the name of the file or directory, or the inode number itself. See 'Rename File or Directory Inode' section below for changing the name of file or directory.

To update a file or directory, the parent directory is looked up as described in the 'Pathname Resolution/Lookup' section above. Then the file inode is read from the key-value store using a composite row key consisting of the parent directory inode number and the file/directory name. This is referred to as the 'old' value of the inode. After performing any required security or integrity checks, a copy of the inode, the 'new' value, is updated in memory with the operation requested by the user, such as updating the last modified time of the inode. The new inode is then stored back to the key-value store using an atomic compare and swap, where the comparison value is the old value of the inode. This ensures that all updates occur in an atomic and serializable order. If the compare and swap fails, the operation can be re-tried.

Rename File or Directory Inode

Renaming is the most complex operation in modern file-systems because it is the only operation that modifies multiple directories in a single atomic action. Renaming both deletes a file from the source directory and creates a file in the destination directory. The complexity of renaming is even greater in a distributed metadata file-system because different servers may be hosting the rename source and destination parent directories—and one or both of those servers could experience machine failure, network timeouts, and so forth during the rename operation. Despite this, the atomicity property of renaming must be maintained from the perspective of all clients.

To rename a file or directory, the rename source parent directory and rename destination parent directory are both resolved as described in the Lookup section. Both directories must exist. The rename source and destination inodes are then read by using composite row keys formed from the rename source parent directory inode number and rename source file/directory name, and the rename destination parent directory inode number and rename destination file/directory name, respectively.

The rename source inode should exist, and the rename destination inode must not exist (as rename is not allowed to overwrite files). At this point, a sequence of actions must be taken to atomically insert the source inode into the destination parent directory, and delete the source inode from the source parent directory.

We perform the core rename operation in a four step process using mutual exclusion row locks. Any of these steps may fail due to lock lease expiration or machine failure. Partially completed rename operations, whether due to machine failure, software error, or otherwise are completely addressed in the 'Rename Inode Failure Recovery' section to preserve atomicity. Recovery occurs as part of inode lookup (see the 'Lookup' section) and is transparent to clients.

Row locks are obtained from the key-value store on the rename source and destination rows (with composite row keys formed from the source/destination parent directory inode numbers and the source/destination file/directory names as per above teachings). It is crucial that these two rows be locked in a well-specified total order. Then the source and destination composite row keys are compared and they must be different values as one cannot rename a file to the same location. The lesser row is locked first, then the greater row is locked. This prevents a deadly embrace deadlock that could occur if multiple rename operations were being executed simultaneously.

With the row locks held, the rename operation occurs in 4 steps:

Step (1): A copy of the source inode is made, and the copy is updated with a flag indicating that the inode is 'Pending Rename Source'. The composite row key of the rename destination is recorded in the new source inode. An atomic compare-and-update is then performed on the source row with the source row lock held. The update value is the new source inode. The comparison value is the value of the original ('old') source inode. If the compare-and-update fails (due to an intervening write to the source inode before the row lock was acquired), the rename halts and returns an error.

Step (2): A second copy of the source inode is made and the copy is updated with a flag indicating that the inode is 'Pending Rename Destination'. This pending destination inode is then updated to change its name to the rename destination name. The inode number remains the same. The composite row key of the rename source is then recorded in the new destination inode. An atomic compare-and-update is performed on the destination row with the destination row lock held. The update value is the new pending rename destination inode. The comparison value is an empty or null value, as the rename destination should not already exist. If the compare-and-update fails, the rename halts and returns an error. The compare-and-update is necessary because the rename destination may have been created in between prior checks and the acquisition of the destination row lock.

Step (3): The row identified by the source composite row key is deleted from the key value store with the source row key lock held. No atomic compare-and-delete is necessary because the source row lock is still held, and thus no intervening operations have been performed on the source inode row.

Step (4): A copy of the 'Pending Destination Inode' is created. This copy, referred to as the 'final destination inode' is updated to clear its 'Pending Rename Destination' flag, and to remove the source row key reference. This marks the completion of the rename operation. The final destination inode is written to the key-value store by updating the row identified by the destination composite row key with the destination row lock held. The update value is the final destination inode. No atomic compare-and-swap is necessary because the destination row lock has been held throughout steps 1-4, and thus no intervening operation could have changed the destination inode.

Finally, the source and destination row locks are unlocked (in any order).

Rename Inode Failure Recovery

A rename operation is the only single file-system operation that modifies multiple rows. As a consequence, a rename operation may fail and leave the inodes in intermediate 'pending' states. Let us denote any inode marked as 'Pending Rename Source' or 'Pending Rename Destination' as 'pending' for this explanation. To transparently and atomically recover from rename failures, the file-system must ensure that all pending inodes are resolved (either by fully redoing or fully undoing the rename operation) before they can be read. All inode reads occur during lookup, as described in the 'Lookup' section.

All inode changes or mutations are performed via a compare-and-update/delete, and in the case of rename, via an initial compare-and-update followed by requiring that all further mutations be performed with the appropriate row lock held, as explained above. No lookup operation or inode read can return an inode in the 'pending' state. Thus, inode modifications cannot operate on an inode that was marked 'pending', because the compare-and-update or compare-and-delete will fail.

If an inode is accessed and is marked 'pending', inode lookup (as described in 'Pathname Resolution/Lookup' section above) will invoke rename recovery of this section.

First, row locks are obtained on the rename source and destination inode as described in the 'Rename File or Directory Inode' section above. We can determine the composite row keys for both rename source and destination rows, as source pending inodes include the composite row key for the destination row, and destination pending inodes include the composite row key for source row.

If the inode is marked 'source pending', recovery occurs via the following sequence of operations:

The source inode is read from the key-value store using the source composite row key with the source row lock held. If the inode differs from the source inode previously read, then a concurrent modification has returned and recovery exits with an error (and a retry may be initiated).

The destination inode is read from the key-value store using the destination composite row key with the destination row lock held.

If the destination inode is not marked 'pending' or if it is marked 'pending' but the source composite row key for the destination inode is not equal to the current source composite row key, then the rename must have failed after Step 1 of 'Renaming File or Directory Inode' section above. Otherwise, the destination inode would have been marked 'Pending Rename Destination' with source composite row key set to the current source inode's composite row key. Since this is not the case, and we know that no further inode modifications on a 'pending' inode can occur until its pending status is resolved, we know that the destination was never marked as 'pending rename' with the current source inode. Consequently, the rename must be undone and the source inode pending status removed. To accomplish this, the source pending inode is modified by clearing the source pending inode flag. Then this change is preferably persisted by performing an update on the key-value store using the row identified by the source composite row key and the value set to the new source inode, with the source row lock held.

Otherwise if the destination inode is marked 'pending' with source composite row key equal to the current source inode composite row key, then in this case, the rename must be 'redone' so that it is completed. The steps taken are exactly the same as those in the original rename operation. This is what allows recovery to be repeated more than once with the same result—in other words, recovery is idempotent. Specifically we repeat Steps (3) and (4) of 'Renaming File or Directory Inode' section above, using the source and destination inodes identified in the recovery procedure.

Otherwise, the 'pending' inode must be marked 'destination pending'. Recovery, in this case, is similar to 'source pending' marked inodes, and is performed as follows:

The destination inode is read from the key-value store using the destination composite row key with the destination row lock held. If the inode differs from the destination inode previously read, then a concurrent modification has returned and recovery exits with an error (and a retry may be initiated).

The source inode is read from the key-value store with the source row key held.

If the source inode does not exist or is marked 'pending' but has its destination composite row key set to a value not equal to the current destination inode's composite row key, then the rename succeeded and the source inode was deleted and replaced by a new value. Otherwise, a mutation would have occurred to modify the source inode, but this is impossible because all read inode operations must resolve any 'pending' inodes before returning, and all inode mutations are performed via compare-and-swap or require mutual exclusion row locks. As the source inode must have been deleted by the rename, the destination inode has its 'Pending Rename Destination' flag cleared. The new inode is then persisted to the key-value store by updating the row identified by the destination composite row key with the new destination inode value, all with the destination row lock held.

Otherwise, the source inode was marked 'rename source pending' and has its destination composite row key set to the current destination's composite row key. In this case, the rename must be re-done so that it can be committed.

To perform this, Steps (3)-(4) of 'Renaming File or Directory Inode' section above are repeated exactly.

Finally, in both the source and destination 'pending' inode cases, the source and destination row locks are unlocked (in either order) and the newly repaired inode is returned. At the end of a source inode pending recovery, the source inode is either null or is not marked 'pending'. Similarly, at the end of a destination inode pending recovery, the inode is not marked 'pending'. Thus, as long as pending rename recovery is performed before an inode can be returned, all inodes read by other file-system routines are guaranteed to be clean, and not marked 'pending', preventing any other operations from reading (and thus modifying) 'pending' inodes.

Write File Data

When a user writes data to a file, that data is buffered. If the total written data exceeds the maximum amount allowed for a key-value store, a new file on a large-file storage subsystem is created, all previously written data is flushed to that file, and all further writes for the file are written directly to the large file storage subsystem.

Otherwise, if the total data written is less than the maximum amount for the key-value store when the file is closed, then the written data is broken into equal-sized blocks, except that the last block may be less than the block size if the total data length is not a multiple of the block size. If the file data consists of B blocks, then B update operations are performed on the key-value store. To write the Ith block, a composite row key is created from the file inode number and the byte offset of the block, which is I*BlockSize. The value of the row is the raw data bytes in the range (I*BlockSize . . . (I+1)*BlockSize−1) inclusive.

Read File Data

To read file data in a specified byte range, the file inode is examined to determine if the file is stored in the key value store or the large-file storage system. If the latter is true, then the read operation is passed directly to the large-file storage system.

Otherwise, the file read operation must be passed to the key-value store. The lower (upper) bounds of the read operation are rounded down (up) to the nearest multiple of the block size. Let the number of blocks in this range be B. B read operations are then issued to the key-value store using a composite row key consisting of the file inode and the (blocksize-aligned) byte offset of the requested block. The B blocks are then combined, and any bytes outside of the requested read operation's lower and upper bounds are discarded. The resulting byte array is returned to client as the value of the read operation.

In view of the above teachings, a person skilled in the art will recognize that the methods and distributed data network of invention can be embodied in many different ways in addition to those described without departing from the spirit of the invention. Therefore, the scope of the invention should be judged in view of the appended claims and their legal equivalents.

I claim:

1. A computer-implemented method for constructing a high-performance distributed file system in a distributed data network, comprising the steps of:
   (a) providing distributed metadata related to files and directories of said distributed file-system;
   (b) assigning a unique and non-reusable mode number to identify each of said files and directories;
   (c) creating a key-value store for said distributed metadata, said key-value store having key-value pairs, where each key-value pair belonging to said key-value pairs comprises a composite row key and a row value;
(d) providing said composite row key of a first set of said key-value pairs to contain a first said mode number of a first file whose size is below or equal to a maximum file size;
(e) providing said composite row key of said first set of said key-value pairs to further contain an offset value;
(f) storing in said row value of said first set of key-value pairs the entirety of said first file if said size of said first file is less than or equal to a size of said row value, otherwise storing in said row value of said first set of key-value pairs a portion of said first file, said portion in said first file identified by said offset value; and
(g) storing a second file whose size exceeds said maximum file size, in a large-scale storage subsystem of said distributed data network.

2. The method of claim 1, wherein said first file below said maximum file size is broken up into blocks of a predetermined size such that each of said blocks fits in said row value of said first set of said key-value pairs and thus storing said first file in multiple row values of said first set of said key-value pairs.

3. The method of claim 1, further comprising the steps of:
(h) providing said composite row key of a second set of said key-value pairs to contain a second said mode number of a parent directory;
(i) providing said composite row key of said second set of said key-value pairs to further contain a name of an item selected from the group consisting of a third file and a directory, said item residing in said parent directory; and
(j) storing in said row value of said second set of said key-value pairs the contents of an mode of said item.

4. The method of claim 3, wherein said blocks have a size of the order of eight kilobytes.

5. The method of claim 4, wherein said maximum file size is of the order of one megabyte.

6. The method of claim 1, wherein file operations of said distributed file-system employ atomic operations applying to said key-value store.

7. The method of claim 6, wherein said file operations include the group consisting of read, write, create, delete and rename.

8. The method of claim 6, wherein said atomic operations are lock-requiring operations performed while holding a leased row-level lock on a single row of said key-value store containing a key-value pair belonging to said key-value pairs.

9. The method of claim 1, wherein said distributed data network comprises at least one file storage cluster that comprises said large-scale storage subsystem.

10. The method of claim 9, wherein said large-scale storage subsystem is selected from the group consisting of BigTable, Hadoop and Amazon Dynamo.

11. A distributed file-system supported in a distributed data network, comprising at least one memory device storing computer-readable instructions, at least one microprocessor coupled to said at least one memory device for executing said computer-readable instructions stored thereon, said at least one microprocessor configured to:
(a) store metadata related to files and directories of said file-system, said metadata distributed amongst a set of servers of said distributed data network;
(b) assign a unique and non-reusable mode number for identifying each of said files and directories;
(c) distribute among said set of servers a key-value store for said distributed metadata, said key-value store having key-value pairs, where each key-value pair belonging to said key-value pairs comprises a composite row key and a row value;
(d) provide said composite row key of a first set of said key-value pairs to contain a first said mode number of a first file whose size is below or equal to a maximum file size;
(e) provide said composite row key of said first set of said key-value pairs to further contain an offset value;
(f) store in said row value of said first set of key-value pairs the entirety of said first file if said size of said first file is less than or equal to a size of said row value, otherwise store in said row value of said first set of key-value pairs a portion of said first file, said portion in said first file identified by said offset value; and
(g) store a second file whose size exceeds said maximum file size, in a large-scale storage subsystem of said distributed data network.

12. The high-performance distributed file-system of claim 11, wherein said set of servers belongs to a single cluster.

13. The high-performance distributed file-system of claim 11, wherein said set of servers is distributed between different clusters.

14. The high-performance distributed file-system of claim 11, wherein said large-scale storage subsystem is geographically distributed.

15. The high-performance distributed file-system of claim 11, wherein said large-scale storage subsystem is selected from the group consisting of BigTable, Hadoop and Amazon Dynamo.

16. The high-performance distributed file-system of claim 11, wherein said row value further comprises at least one member selected from the group consisting of a permission, an ownership, a file size and a storage location of an item selected from the group consisting of said file and said directory.

17. The high-performance distributed file-system of claim 11, wherein said file below said maximum file size is broken up into blocks such that each of said blocks fits in said row value of said key-value pair, and said file is further stored in successive row values of said key-value pairs.

18. The high-performance distributed data network of claim 11, wherein said mode number of a root directory of said distributed file system is 0.

19. The high-performance distributed system of claim 11, wherein said at least one microprocessor is further configured to:
(h) provide said composite row key of a second set of said key-value pairs to contain a second said mode number of a parent directory;
(i) provide said composite row key of said second set of said key-value pairs to further contain a name of an item selected from the group consisting of a third file and a directory, said item residing in said parent directory; and
(j) store in said row value of said second set of said key-value pairs the contents of an mode of said item.

* * * * *